United States Patent [19]

Brockington

[11] 4,008,178
[45] Feb. 15, 1977

[54] ALKYLATION CATALYST FOR PRODUCTION OF MOTOR FUELS

[75] Inventor: James W. Brockington, Richmond, Va.

[73] Assignee: Texaco Inc., New York, N.Y.

[22] Filed: Apr. 11, 1975

[21] Appl. No.: 567,329

Related U.S. Application Data

[62] Division of Ser. No. 520,595, Nov. 4, 1974, Pat. No. 3,922,319.

[52] U.S. Cl. .............................. 252/434; 252/436; 252/440
[51] Int. Cl.² ...................... B01J 27/00; B01J 27/02
[58] Field of Search .................. 252/436, 440, 434

[56] References Cited
UNITED STATES PATENTS

| | | | |
|---|---|---|---|
| 2,214,481 | 9/1940 | Schmerling et al. | 252/436 X |
| 2,441,103 | 5/1948 | Meadow | 252/434 X |
| 3,231,633 | 1/1966 | Kramer | 260/683.51 |
| 3,413,362 | 11/1968 | Otaku | 252/436 X |
| 3,867,475 | 2/1975 | Estes et al. | 252/436 X |

*Primary Examiner*—Winston A. Douglas
*Assistant Examiner*—William G. Wright
*Attorney, Agent, or Firm*—T. H. Whaley; C. G. Ries; Douglas H. May, Jr.

[57] ABSTRACT

A liquid phase alkylation process for production of alkylate useful as motor fuel, wherein low molecular weight isoparaffin hydrocarbons are alkylated with olefin hydrocarbons in the presence of a catalyst comprising $HFSO_3$ and $H_2SO_4$ in weight ratio of from about 0.11 to 1 to about 0.32 to 1, respectively, having a titratable acidity in the range of 16.5 to 21 milliequivalents per gram, and which may contain about 0–3 weight percent water and about 0–10 weight percent acid oils.

2 Claims, No Drawings

ALKYLATION CATALYST FOR PRODUCTION OF MOTOR FUELS

This is a division of application Ser. No. 520,595 filed Nov. 4, 1974 now U.S. Pat. No. 3,922,319.

BACKGROUND OF THE INVENTION

1. Field of the Invention

The present invention relates to liquid phase, acid catalyzed alkylation of isoparaffin hydrocarbon with olefin hydrocarbon for production of alkylate having high octane value and being suitable for gasoline blending stock. More particularly, the present invention relates to such an alkylation process wherein improved acid catalysts comprising selected ratios of fluorosulfonic and sulfuric acid are employed.

2. Description of the Prior Art

Liquid phase alkylation processes wherein isoparaffin hydrocarbons, such as isobutane, isopentane, etc. are alkylated with olefin hydrocarbons such as propylene, butylenes, etc., for production of alkylate products comprising highly branched $C_7$–$C_8$ range paraffin hydrocarbons having high octane values, are well known and widely practiced. In such alkylation processes, reactant hydrocarbons are generally contacted in the liquid phase, at temperatures in the range of from about 0° F–100° F, in the presence of acid alkylation catalyst under conditions of good mixing to produce the desired alkylate hydrocarbons. Reaction pressures, which may vary from about ambient to superatmospheric, are sufficient to maintain reactants in the liquid phase. Higher pressures apparently have no substantial effect upon such alkylation reactions. Acid catalysts may be selected from a wide range of strong acids including sulfuric acid and fluorosulfonic acid. Generally, liquid alkylation catalysts such as sulfuric acid and fluorosulfonic acid are substantially immiscible with isoparaffin hydrocarbon reactants. Consequently, reactant hydrocarbons and liquid alkylation catalysts are contacted in an alkylation zone under conditions of high shear mixing sufficient to form an emulsion of immiscible hydrocarbon and catalyst. Detailed description of such alkylation processes is not required herein, as such processes are well known and widely practiced in the prior art.

In such alkylation processes side reactions take place in addition to desired alkylation reactions wherein 1:1 olefin-isoparaffin adducts are produced. For example, olefin hydrocarbons tend to polymerize in the presence of strong acid catalysts to form $C_{12}$ and higher molecular weight polymers; also such polymers tend to crack in the presence of the strong acid catalyst forming low octane $C_5$–$C_7$ hydrocarbons. These side reaction products, e.g., olefin polymers and cracked products, have relatively low octane values and are not as desirable as the 1:1 olefin isoparaffin alkylation products for use as gasoline blending stocks.

In order to maximize the yield of the desired alkylate products at the expense of the undesired side reaction products, care is taken to insure good contact of isoparaffin reactants with olefin reactants in the presence of alkylation catalysts under reaction conditions which favor formation of alkylate hydrocarbon products over side reaction products. For example, reaction temperatures are maintained in the range of about 0° F to about 100° F wherein the alkylation of isoparaffins with olefins proceeds at economically attractive rates and wherein olefin polymerization rates are not so great as to consume excessive amounts of olefin reactant. Further, a substantially stoichiometric excess of isoparaffins over that required to react with olefin is employed to insure contact of isoparaffins with olefins under alkylation reaction conditions. Further, as olefin reactants are generally substantially more soluble in acid catalysts than are isoparaffin reactants, high-shear mixing of the alkylation reaction mixture is generally provided sufficient to form emulsions of acid catalysts and hydrocarbon reactants. Formation of such emulsions increases the contact area between acid catalyst, containing dissolved olefins with isoparaffin hydrocarbons, thus materially improving yield and quality of alkylate product.

Commonly, where sulfuric acid is the selected acid catalyst, the alkylation reaction emulsion is one wherein isoparaffin hydrocarbon is emulsified in a continuous acid phase, although it is known to employ reaction emulsions comprising acid catalyst phase suspended in a continuous isoparaffin hydrocarbon phase. Alkylation reaction mixtures comprising about 40–70 volume percent sulfuric acid catalyst and about 60–30 volume percent hydrocarbon phase are known to form emulsions wherein the acid phase is continuous.

In the prior art, sulfuric and fluorosulfonic acids alone, and mixtures of the two comprising a major portion of fluorosulfonic acid, are known to be effective catalysts for the liquid phase alkylation of isoparaffin hydrocarbons with olefin hydrocarbons. Additionally, U.S. Pat. No. 2,313,013 claims that alkylation of an isoparaffin with an olefin hydrocarbon employing pure fluorosulfonic acid as catalyst is superior to alkylation employing sulfuric acid catalyst. In U.S. Pat. No. 3,231,633 it is taught that the catalytic activity of fluorosulfonic acid may be improved by the addition of a minor amount of $H_2SO_4$ (e.g., not less than 50 weight percent $HFSO_3$ in the catalyst) thereto. Also, In U.S. Pat. No. 2,425,572, it is disclosed that the catalytic activity of $H_2SO_4$ may be substantially improved by the addition of about 1–10% of chlorosulfonic acid or other substituted sulfonic acids.

The sulfonic acids, such as fluorosulfonic and chlorosulfonic, are relatively expensive materials compared to sulfuric acid. In alkylation reactions, acid catalyst is consumed at rates ranging from about 0.1 up to 10 and more pounds of catalyst per gallon of alkylate product as a result of side reactions such as hydrolysis and reaction with olefin hydrocarbons. Consequently, the expense of providing sulfonic acids as the major components of alkylation catalysts may become prohibitively expensive in commercial alkylation processes. Both fluorosulfonic and chlorosulfonic acid are known to react with water thereby forming the respective hydrogen halide and $H_2SO_4$. Consequently, alkylation processes employing catalysts comprising a major portion of such sulfonic acids must be kept substantially dry in order to prevent destruction of the acid.

SUMMARY OF THE INVENTION

Now, according to the present invention I have discovered an improved alkylation process wherein $C_4$–$C_6$ isoparaffin hydrocarbons are alkylated with $C_3$–$C_5$ olefin hydrocarbons in the presence of a novel alkylation catalyst comprising fluorosulfonic acid and $H_2SO_4$ in a weight ratio of from about 0.11 to 1 to about 0.32 to 1, respectively, having a titratable acidity in the range of 16.5 to 21 milli-equivalents per gram (meq/gm), and which may contain about 0–3 weight percent water and about 0–10 weight percent acid oils.

In a preferred embodiment, an isoparaffin hydrocarbon such as isobutane is contacted with olefin hydrocarbons such as propylene, butylenes, and mixtures thereof in a molar ratio of isoparaffin to olefin of from about 2:1 to 20:1 in the liquid phase, in the presence of an alkylation catalyst comprising fluorosulfonic acid and $H_2SO_4$ in a weight ratio of 0.17 to 1 and having a titratable acidity of from about 16.5 to about 18.5 meq/gm, at a temperature in the range from about 0° F to about 100° F for a production of alkylate hydrocarbon product having high octane value and being suitable for use in gasoline motor fuel. Preferably, the alkylation reaction mixture is subjected to good mixing to form a hydrocarbon in continuous acid phase emulsion which comprises from about 40 to about 70 volume percent acid phase and from about 60–30 percent hydrocarbon phase. Residence time of reactant hydrocarbons in the presence of acid catalyst under alkylation reaction conditions is preferably such that olefin space velocity is in the range of about 0.1 to about 1.0 volumes olefin per hour per volume of catalysts.

Advantages of the present invention include alkylate products of increased octane values as well as decreased acid consumption per volume of alkylate produced. Additionally, by employing the improved catalysts of the present invention, wherein fluorosulfonic acid is present in minor proportion, catalyst costs are moderate. These, and other advantages will be discussed in the detailed description which follows.

DETAILED DESCRIPTION OF THE INVENTION

The improvement of the present invention comprises use of a novel alkylation catalyst in processes for alkylating $C_4$–$C_6$ isoparaffin hydrocarbons with $C_3$–$C_5$ olefin hydrocarbons for production of high octane alkylate products suitable for use in blending of gasoline motor fuel.

It is well known that sulfuric acid is a particularly effective catalyst for the alkylation of isoparaffin hydrocarbon with olefin hydrocarbon. Additionally, it is known that sulfonic acid, including fluorosulfonic ($HFSO_3$), chlorosulfonic, and various organic sulfonic acids are effective alkylation catalyst used alone or in admixture with other strong acids such as sulfuric acid. For example, see U.S. Pat. No. 2,259,723, Ballard et al, which teaches the use of chlorosulfonic and fluorosulfonic acids in admixture with hydrogen halides, U.S. Pat. No. 3,766,293, Parker et al which teaches the use of "fluorosulfuric" acid in combination with a minor amount of catalyst promoter which may include sulfuric acid; U.S. Pat. No. 2,231,633, Kramer, which teaches an alkylation process employing fluorosulfonic acid in combination with up to about 50 weight percent sulfuric acid; and U.S. Pat. No. 2,425,572, Slotterback, which teaches an alkylation process wherein a minor portion (1–10%) of chlorosulfonic acid or other substituted sulfonic acids, such as aliphatic sulfonic acids, are added to the sulfuric acid alkylation catalyst. Fluorosulfonic acid, as well as other sulfonic acids, is relatively expensive compared to sulfuric acid. Thus, one of the major disadvantages of using fluorosulfonic acid, or other sulfonic acids, as alkylation catalysts is high cost of these acids. It is disclosed that fluorosulfonic and chlorosulfonic acids are easily hydrolyzed by water into $H_2SO_4$ and the respective hydrogen halide. Consequently, it has been considered desirable, when using these sulfonic acids as major components of alkylation catalyst, to maintain the alkylation system as dry as possible in order to conserve the catalyst. Since many, or most, commercially available isoparaffin and olefin charge stocks contain water, means must be provided for drying such charge stock if sulfonic acids are not to be hydrolyzed. Also, where sulfuric acid is to be used as a minor component, commercially available concentrated sulfuric acid of 99.5 to 98 weight percent $H_2SO_4$ must be dried or converted to oleum by addition of $SO_3$. Surprisingly, we have discovered an alkylation catalyst comprising sulfuric acid and fluorosulfonic acid which can tolerate substantial amounts of water and which is effective for producing alkylate of increased octane value. Additionally, use of the novel catalyst of the present invention results in decreased consumption of catalyst in the alkylation process. The novel catalyst of the present invention comprises fluorosulfonic acid and $H_2SO_4$ in a weight ratio of from about 0.11 to 1 to about 0.32 to 1 respectively, and preferably in a weight ratio of about 0.17 to 1. Such catalyst has titratrable acidity of from about 16.5 to about 21 milliequivalents per gram (meq/gm) and may contain from about 0 to about 3 wt. % water and from about 0 to about 10 wt. % acid oils. The acid oils are relatively high molecular weight reaction products of sulfuric acid with hydrocarbons present in the alkylation process. The titratable acidity of catalysts in the present invention is determined by titrating a sample of catalyst with a standard aqueous solution of a base, such as sodium hydroxide, to neutralize the acid, and subsequently calculating the molecular equivalents of base required. A catalyst having titratable acidity below about 16.5 (meq/gm), alkylation catalyst activity decreases and the rate of undesirable olefin polymerization reactions increase.

For the acid catalyst of the present invention, we have discovered that the ratio of sulfuric acid to fluorosulfonic acid is critical for obtaining high octane alkylate. That is, a weight ratio of from about 0.11 to 1 to about 0.32 to 1 fluorosulfonic to sulfuric acid, and preferably about 0.17 to 1 weight ratio of fluorosulfonic to sulfuric acid provides alkylate of higher octane than catalyst compositions containing either more or less fluorosulfonic acid. That is, a peak, or maximum, in alkylate product octane value occurs when using a catalyst having the preferred weight ratio of fluorosulfonic acid to sulfuric acid. This result is most unexpected and provides a particular advantage as alkylate with maximum octane value is obtained employing catalyst having a rather low concentration of fluorosulfonic acid. Consequently, acid catalyst costs for the mixture are moderate and are substantially below the cost of fluorosulfonic acid alone. Additionally, when using the improved catalyst of the present invention, acid consumption per barrel of alkylate product is also reduced over acid consumption employing sulfuric acid alone. Therefore, total catalyst cost per barrel of alkylate product may be below acid catalyst cost employing only sulfuric acid.

The acid catalyst of this invention may contain from about 1 to about 3% water without being seriously deactivated. This is unexpected since it is well known that fluorosulfonic acid is hydrolyzed by cold water and rapidly decomposes. Efforts to form a similar catalyst to the catalyst of the invention employing chlorosulfonic acid were unsuccessful because the chlorosulfonic acid reacted rapidly, evolving hydrogen chloride vapors, with water contained in the 98 percent commercial sulfuric acid used. The catalytic activity of the resulting mixture of sulfuric acid and chlorosulfonic acid was substantially below the catalytic activity of the catalyst of the present invention. As the catalyst of the present invention may contain substantial amounts of water without seriously affecting catalytic activity, it is possible to formulate such fresh catalysts employing commercially available sulfuric acid of about 99.5–98 weight percent $H_2SO_4$ concentration and containing up to 2% water.

Fluorosulfonic acid, having the chemical formula $HFSO_3$, which may be used in the practice of the present invention need not be completely pure. Commercial grades of fluorosulfonic acid having purities of about 99 weight percent may be used to formulate the catalysts of the present invention.

Sulfuric acid which is useful in formulating the fresh catalyst of the present invention is concentrated sulfuric acid, preferably of about 99.5–98 weight percent $H_2SO_4$ and containing about 0.5–2 weight percent water.

Alkylation processes contemplated in the present invention are those liquid phase processes wherein isoparaffin hydrocarbons such as isobutane, isopentane, isohexane, etc. are alkylated with mono-olefin hydrocarbons such as propylene, butylenes, pentylenes, etc. for production of high octane alkylate hydrocarbons boiling in the gasoline range and which are suitable for use in gasoline motor fuel. Preferably, isobutane is selected as the isoparaffin reactant and olefin reactant is selected from propylene, butylenes, and mixtures thereof for production of an alkylate hydrocarbon product comprising a major portion of highly branched aliphatic $C_8$ hydrocarbons having high octane value. Such olefin reactants in the presence of strong acids and particularly sulfuric acid, tend to undergo undesirable side reactions such as polymerization as well as desirable alkylation reactions with isoparaffin hydrocarbons. In order to increase selectivity of olefin hydrocarbon conversion for alkylation with isoparaffin hydrocarbon, a substantial stoichiometric excess of isoparaffin hydrocarbon is desirable in the reaction zone. Liquid volume ratios of isoparaffin hydrocarbon to olefin hydrocarbon of from about 2 to 1 to about 20 to 1 are contemplated in the present invention. Isoparaffin and olefin reactant hydrocarbons normally employed in commercial alkylation processes are derived from refinery process streams and usually contain small amounts of impurities such as normal butane, propane, etc. Such impurities are undesirable in large concentration as they dilute reactants in the reaction zone, thus decreasing reactor capacity available for the desired reactants and interferring with good contact of isoparaffin with olefin reactants. Additionally, in continuous alkylation processes wherein excess isoparaffin hydrocarbon is recovered from an alkylation reaction effluent and recycled for contact with additional olefin hydrocarbon, such nonreactive normal paraffin impurities tend to accumulate in the alkylation system. Consequently, process charge streams and/or recycle streams which contain substantial amounts of normal paraffin impurities are usually fractionated to remove such impurities and maintain their concentration at a low level, preferably less than about 5%, in the alkylation process.

Alkylation reaction temperatures within the contemplation of the present invention are in the range of from about 0° F to about 100° F. Lower temperatures favor alkylation reactions of isoparaffin with olefin over competing olefin side reactions such as polymerization. However, overall reaction rates decreases with decreasing temperatures. Temperatures within the given range, and preferably in the range from about 40° F to about 70° F, provide good selectivity for alkylation of isoparaffin with olefin at commercially attractive reaction rates.

Reaction pressures contemplated in the present invention are sufficient to maintain reactants in the liquid phase and may range from ambient to superatmospheric. Reactant hydrocarbons may be normally gaseous at alkylation reaction temperatures, thus reaction pressures in the range of about 10–150 psig are preferred. With all reactants in the liquid phase, increased pressure has no significant effect upon the alkylation reaction.

Contact times for hydrocarbon reactants in an alkylation zone, in the presence of the alkylation catalyst of the present invention may range from about 0.5 to about 60 minutes. Preferably, contact time is sufficient for essentially complete conversion of olefin reactant in the alkylation zone. In the alkylation process of the present invention, employing isoparaffin and olefin reactants in volume ratios in the range of 2:1 to 20:1, wherein the alkylation reaction mixture comprises about 40–70 volume percent acid catalyst phase and about 60–30 volume percent hydrocarbon phase, and wherein good contact of olefin with isoparaffin is maintained in the reaction zone, essentially complete conversion of olefin may be obtained at olefin space velocities in the range of about 0.1 to 1 volumes olefin per hour per volume catalyst (v/v/hr.). Optimum space velocities will depend upon isoparaffin and olefin reactants, the particular compositions of alkylation catalyst, and alkylation reaction conditions. Consequently, the preferred contact times are sufficient for providing an olefin space velocity in the range of 0.1 to 1 (v/v/hr) and allowing essentially complete conversion of olefin reactant in the alkylation zone.

Batch or continuous methods of operation may be used. Different procedures, which may vary with the method of operation, may be used for ensuring the presence of acid catalyst having the desired acidity and ratio of $H_2SO_4$ to $HFSO_3$ in the reaction mixture. Thus, in batch operations, acid catalyst having the desired ratio of $H_2SO_4$ to $HFSO_3$ and having an acidity in the higher range may be added with isoparaffin to a reaction vessel. Olefin reactant can then be added at a desired rate to the reaction mixture for a time until acidity of the acid catalyst declines, or until a substantial portion of the isoparaffin reactant is consumed.

In a continuous process, isoparaffin and acid catalyst are continuously charged separately to an alkylation zone maintained at alkylation reaction conditions. Olefin hydrocarbon may be separately charged, or may be added in admixture with the isoparaffin at a rate to maintain the desired olefin space velocity in the alkylation zone. Reaction effluent is continuously removed from the alkylation zone and separated into an acid phase and a hydrocarbon phase comprising unreacted isoparaffin and alkylate hydrocarbon. Separated acid phase is recycled for contact with additional hydrocarbon reactants. Preferably, the acid phase contains from 5 to 30 volume percent hydrocarbon for improving contact of isoparaffin with olefin in the presence of the acid catalyst. A portion of the acid phase may be continuously or intermittently withdrawn from the process for removal of water and acid oil impurities. Fresh acid catalyst, comprising $H_2SO_4$ and $HFSO_3$ in the selected ratio and having high acidity is added to make up for the acid phase withdrawn, thereby maintaining the acidity of the acid catalyst in the alkylation zone within the desired range of acidity. The separated hydrocarbon phase may be fractionated in a fractionation zone into an alkylate fraction and an unreacted isoparaffin fraction. Additionally, hydrocarbon impurities, such as normal paraffins, may be fractionated from isoparaffins in the fractionation zone. Preferably, fractional distillation methods are employed to fractionate the separated hydrocarbon phase. The isoparaffin fraction may be recycled to the alkylation zone for contact with additional reactants.

The desired agitation of the reaction mixture, for insuring good contact of isoparaffin with olefin in the alkylation zone, may be provided in a number of ways. For instance, mechanical mixers may be used for forming a reaction emulsion of hydrocarbon and acid cata- Intermittently, fresh acid catalyst was added to the recycle catalyst phase for maintaining catalyst acidity at a preselected value, and spent catalyst was withdrawn to maintain the catalyst volume in the system.

For alkylation runs employing $H_2SO_4$ catalyst, fresh catalyst makeup was 97.9% $H_2SO_4$ containing about 2.1% water. For alkylation runs employing the mixed catalysts of the present invention, fresh catalyst comprised 14.3 weight percent $HFSO_3$, 83.9 weight percent $H_2SO_4$, and 1.8 weight percent $H_2O$, which results in a fresh catalyst having 0.172 to 1 weight ratio of fluorosulfonic acid to sulfuric acid and titratable acidity of 21.53 meq/gm.

Operating conditions and results of this first series of alkylation runs, are set-out in Table I below. Butylene space velocities (volumes olefin per hour per volume catalyst) were maintained relatively constant, as were reaction temperatures and isobutane-to-butylene volume ratios. Acidity of the equilibrium mixed catalyst in the reaction zone varied over a narrow range (17.3–18.2 meq/gm).

TABLE I

| Run No. | Temp °F | Catalyst Type | Acidity meq/gm | Olefin space velocity v/v/hr. | Isoparaffin/ olefin volume ratio | Acid Consumption lb acid/ gal. alky. | Alkylate Octane Clear MON | RON |
|---|---|---|---|---|---|---|---|---|
| 1 | 50 | Mixed $HFSO_3$-$H_2SO_4$ | 18.1 | 0.21 | 6.26 | 0.75 | 93.4 | 35.7 |
| 2 | 50 | Mixed $HFSO_3$-$H_2SO_4$ | 18.2 | 0.19 | 6.26 | 0.86 | 93.2 | 95.6 |
| 3 | 50 | Mixed $HFSO_3$-$H_2SO_4$ | 18.2 | 0.17 | 6.26 | 1.01 | 93.3 | 95.6 |
| 4 | 50 | Mixed $HFSO_3$-$H_2SO_4$ | 17.3 | 0.24 | 6.26 | 0.36 | 92.8 | 95.3 |
| 5 | 50 | Mixed $HFSO_3$-$H_2SO_4$ | 17.3 | 0.23 | 6.26 | 0.30 | 92.5 | 95.0 |
| 6 | 50 | $H_2SO_4$ | 18.4 | 0.23 | 6.26 | 0.74 | 92.8 | 95.3 |
| 7 | 50 | $H_2SO_4$ | 18.4 | 0.24 | 6.26 | 0.80 | 92.3 | 94.9 | lyst in the alkylation zone. Additionally, charge and recycle streams may be charged through nozzles or jets into the reaction zone for providing the desired agitation. These, and other methods for obtaining good liquid-liquid mixing in the alkylation zone may be used advantageously in the method of the present invention.

The following examples demonstrate the advantages of the present invention. These examples are by way of illustration only, and are not intended as limitations upon the invention as set out in the appended claims.

EXAMPLE I

Series of continuous alkylation runs were performed in the liquid phase, at about 50° F, employing as reactant charge stocks a petroleum refinery butylene stream and technical grade isobutane. The purpose of these runs was to compare alkylation reactions employing sulfuric acid catalyst with alkylation reactions employing the mixed $H_2SO_4$-$HFSO_3$ catalysts of the present invention. In all these alkylation runs, acid catalyst and reactant hydrocarbons were contacted in an alkylation reactor with mechanical mixing to form a reaction emulsion. Reaction emulsion was continuously withdrawn and separated, by gravity settling, into a catalyst phase and a hydrocarbon phase. Separated catalyst phase was recycled to the alkylation reaction for contact with additional reactant hydrocarbons.

From Table I, comparison of Runs 1–3 with Runs 6 and 7, made at approximately the same catalyst acidity, demonstrates that octane of alkylate produced employing the mixed $HFSO_3$-$H_2SO_4$ catalyst of the present invention is increased over octane of alkylate produced under similar conditions employing $H_2SO_4$ catalyst. Comparison of runs 4 and 5 with runs 6 and 7 demonstrates that in alkylation runs operated to yield alkylates of about the same octane value, acid consumption when using catalyst of the present invention is about ½ the acid consumption when using $H_2SO_4$ catalyst.

EXAMPLE II

A second series of alkylation runs was made employing the alkylation process of Example I. Olefin space velocity, catalyst acidity, and isoparaffin to olefin ratio were varied to determine their effect. Comparison runs were made between the mixed $H_2SO_4$-$HFSO_3$ catalysts of the present invention and $H_2SO_4$ catalyst. For akylation runs employing $H_2SO_4$ catalyst, fresh catalyst make-up was 98.0% $H_2SO_4$ containing about 2.0% water. For alkylation runs employing the mixed $H_2SO_4$-$HFSO_3$ catalyst of the present invention, fresh catalyst comprised 14.3 weight percent $HFSO_3$, 84.0 weight percent $H_2SO_4$, and 1.7 weight percent $H_2O$. Operating conditions and results of this second set of alkylation runs are set-out in Table II, following.

TABLE II

| Run No. | Temp. °F | Catalyst Type | Catalyst Acidity meq/gm | Olefin space velocity v/v/hr. | Isoparaffin/ olefin volume ratio | Acid Consumption lb acid/ gal. alky. | Alkylate Octane Clear MON | Alkylate Octane Clear RON |
|---|---|---|---|---|---|---|---|---|
| 8  | 50 | Mixed    | 18.0 | 0.22 | 6.73 | 0.47 | 94.0 | 96.4 |
| 9  | 50 | Mixed    | 18.5 | 0.46 | 6.37 | 0.60 | 93.6 | 95.8 |
| 10 | 50 | Mixed    | 18.1 | 0.47 | 5.51 | 0.43 | 94.0 | 96.3 |
| 11 | 50 | Mixed    | 18.0 | 0.52 | 5.51 | 0.45 | 94.2 | 96.6 |
| 12 | 50 | Mixed    | 17.5 | 0.42 | 5.51 | 0.22 | 93.2 | 95.5 |
| 13 | 50 | Mixed    | 16.9 | 0.42 | 5.51 | 0.28 | 91.3 | 93.7 |
| 14 | 50 | Mixed    | 18.0 | 0.57 | 6.73 | 0.38 | 93.2 | 95.7 |
| 15 | 50 | Mixed    | 18.2 | 0.63 | 6.37 | 0.48 | 92.9 | 95.2 |
| 16 | 50 | Mixed    | 18.0 | 0.77 | 6.73 | 0.21 | 92.3 | 94.6 |
| 17 | 50 | Mixed    | 18.4 | 0.79 | 6.37 | 0.33 | 93.5 | 95.8 |
| 18 | 50 | $H_2SO_4$ | 18.5 | 0.21 | 6.73 | 0.52 | 93.1 | 95.7 |
| 19 | 50 | $H_2SO_4$ | 18.4 | 0.43 | 5.51 | 0.45 | 91.8 | 94.3 |
| 20 | 50 | $H_2SO_4$ | 18.6 | 0.68 | 6.73 | 0.44 | 91.8 | 94.3 |
| 21 | 50 | $H_2SO_4$ | 18.5 | 0.79 | 6.03 | 0.42 | 91.6 | 94.1 |

As can be seen from Table II, alkylate octane value is greater and acid consumption is less when employing the mixed $H_2SO_4$-$HFSO_3$ catalyst of the present invention, as compared to using $H_2SO_4$ catalyst at similar conditions.

Attention is drawn to runs 10–13, wherein acidity of the $H_2SO_4$-$HFSO_3$ mixture varies from 18.1 to 16.9 meq/gm at otherwise about the same operating conditions. Alkylate octane decreases slightly and acid consumption decreases significantly as catalyst acidity decreases from 18.1 to 17.5 meq/gm. However, in going from acidity of 17.5 to 16.9 meq/gm, alkylate octane decreases significantly, and acid consumption increases, indicating that olefin side reactions were becoming significant at the expense of desired alkylation reaction. However, at the catalyst acidity of 16.9 meq/gm, acid consumption is still significantly better than for alkylation with $H_2SO_4$ alone (see run 19). Consequently, from these results, it appears $H_2SO_4$-$HFSO_3$ mixed catalyst systems are effective at catalyst acidities greater than about 16.5 meq/gm, and preferably in the range of about 17–18.5 meq/gm.

EXAMPLE III

A third series of alkylation runs was made employing the alkylation process of Example I to demonstrate the effectiveness of the process of the present invention for alkylating with mixtures of butylene and propylene olefins; space velocity, catalyst acidity and isoparaffin to olefin ratio were maintained about the same throughout this series of runs. The olefin charge stock comprised a refinery mixture of propylene and butylenes in a weight ratio of about 6/7.9. Isoparaffin comprised technical grade isobutane. Comparison runs, using $H_2SO_4$ as catalyst, are included in this series of alkylation runs. Fresh $H_2SO_4$ catalyst comprised 98.0% $H_2SO_4$ containing 2.0% water. Fresh $H_2SO_4$-$HFSO_3$ catalyst comprised 14.3 weight percent $HFSO_3$, 84.0 weight percent $H_2SO_4$, and 1.7 weight percent $H_2O$. Operating conditions and results of this series of runs are shown in Table III below.

TABLE III

| Run No. | Temp. °F | Catalyst Type | Acidity meq/gm | Olefin space velocity v/v/hr. | Isoparaffin olefin volume ratio | Acid Consumption lb acid/ gal. alky | Alkylate Octane MON (clear) | RON (clear) |
|---|---|---|---|---|---|---|---|---|
| 22 | 50 | Mixed    | 17.9 | 0.19 | 5.46 | 0.53 | 91.1 | 93.2 |
| 23 | 50 | Mixed    | 17.2 | 0.18 | 5.46 | 0.53 | 90.2 | 92.4 |
| 24 | 50 | Mixed    | 17.3 | 0.17 | 5.46 | 0.39 | 90.8 | 93.1 |
| 25 | 50 | $H_2SO_4$ | 18.8 | 0.23 | 5.46 | 1.04 | 90.8 | 93.2 |
| 26 | 50 | $H_2SO_4$ | 18.4 | 0.24 | 5.46 | 0.81 | 90.5 | 92.8 |

From the comparative examples of Table III it is seen that, for alkylating isoparaffin with mixed propylene-butylene olefins to yield alkylate of about the same octane value, acid consumption was significantly less when the $H_2SO_4$-$HFSO_3$ catalyst of the present invention was employed in the alkylation process, as compared to acid consumption when $H_2SO_4$ catalyst was used.

EXAMPLE IV

Comparison alkylation runs were made to demonstrate the advantage of the fluorosulfonic-sulfuric acid ($HFSO_3$-$H_2SO_4$) mixtures of the present invention over similar mixtures of chlorosulfonic-sulfuric acid ($HClSO_3$-$H_2SO_4$). For these comparison runs, the continuous alkylation process of Example I was employed. In both runs, the halosulfonic acid comprises 15 volume percent of the fresh acid catalyst mixture, while sulfuric acid (97.8 weight percent $H_2SO_4$, 2.2 weight percent $H_2O$) comprises 85 volume percent of the mixture. Table IV, below, contains operating conditions and results obtained for these comparative runs.

TABLE IV

| Run No. | Temp. °F | Catalyst Type | Olefin space velocity v/v/hr. | Isoparaffin/ olefin volume ratio | Alkylate Octane MON | RON |
|---|---|---|---|---|---|---|
| 27 | 50 | $HFSO_3$ $H_2SO_4$ | 0.43 | 6.9/1 | 93.3 | 95.6 |
| 28 | 50 | $HClSO_3$ | 0.38 | 6.9/1 | 92.5 | 94.7 |

TABLE IV-continued

| Run No. | Temp. °F | Catalyst Type | Olefin space velocity v/v/hr. | Isoparaffin/ olefin volume ratio | Alkylate Octane MON | RON |
|---|---|---|---|---|---|---|
| | | $H_2SO_4$ | | | | |

From Table IV, it can be seen that the $HFSO_3$-$H_2SO_4$ acid catalyst mixture of the present invention is superior to the $HClSO_3$-$H_2SO_4$ mixture in catalyzing the alkylation of isoparaffin with olefins. Both alkylate research and motor octane values are substantially higher when using the catalyst of the present invention.

Since both $HFSO_3$ and $HClSO_3$ are very strong acids, an effort was made to determine why the difference in behavior occurred. Analysis of the two mixed acid systems revealed considerable differences in behavior between the two halo-sulfonic acids. In the analyses, chloride and fluoride concentrations were determined for fresh and spent acid catalyst, and these are set out in Table V, below.

TABLE V

| Fresh Catalyst | Halide Ion Concentration Fresh Acid | | Halide Ion Concentration Spent Acid mg/gm | Time on Stream hrs. |
|---|---|---|---|---|
| | Theoretical mg/gm | Actual mg/gm | | |
| $HFSO_3$-$H_2SO_4$ | 27.17 | 27.9 | 28.2 | 45 |
| $HClSO_3$-$H_2SO_4$ | 44.06 | 13.9 | 0.2 | 8 |

From Table V, it is seen that actual fluoride concentration of the fresh acid is, within experimental error, the same as predicted by theory. Further, after 45 hours of running in the alkylation unit, the spent $HFSO_3$-$H_2SO_4$ contains the same fluoride concentration as the fresh acid. In contrast, the $HClSO_3$-$H_2SO_4$ fresh acid chloride concentration after mixing is only 32% of the theoretical chloride concentration (13.9 mg/gm actual chloride compared to 44.06 mg/gm theoretical chloride). After running in the alkylation system for about 8 hours, chloride concentration of the spent acid is essentially nil. At this point, the spent catalyst is no longer a mixed $HClSO_3$-$H_2SO_4$ acid system, but simply a sulfuric acid system. The loss of chloride is apparently due to rapid reaction of $HClSO_3$ with water to form HCl and $H_2SO_4$. The HCl leaves the acid catalyst as a gas, lowering the chloride concentration. This loss of HCl as a gas is observed upon adding $HClSO_3$ to 97.8 weight percent $H_2SO_4$, whereupon rapid reaction with evolution of vapors, ensues at room temperatures. Water enters the alkylation process with the concentrated $H_2SO_4$ and with hydrocarbon charge streams. During the alkylation reaction additional water is generated through side reactions. This water reacts with $HClSO_3$, reducing its concentration to near zero very quickly. Such a situation is not encountered with $HFSO_3$. Although $HFSO_3$ is capable of reacting with water to form HF and $H_2SO_4$, it does so to a lesser extent than $HClSO_3$ under conditions existing in the alkylation process. Thus, mixed $H_2SO_4$-$HClSO_3$ cannot be effectively used in the process of the present invention due to the water present in the $H_2SO_4$, the olefin feed, and as a product of side reactions. On the other hand, mixed $HFSO_3$-$H_2SO_4$ catalysts are not seriously affected by the amount of water normally present in such alkylation processes.

EXAMPLE V

Alkylation runs were made to determine the optimum $HFSO_3$/$H_2SO_4$ ratio for such a mixed acid catalyst. Such runs were continuous and operated according to the alkylation process of Example I. Operating conditions and results of these alkylation runs are shown in Table VI, following.

TABLE VI

| Run No. | Temp. °F | Fresh Catalyst % $HFSO_3$ | Fresh Catalyst weight ratio $HFSO_3$/$H_2SO_4$ | Spent Catalyst Acidity meq/gm | Olefin space velocity v/v/hr. | Isoparaffin/ olefin volume ratio | Acid Consumption lb acid / gal. alky | Alkylate Octane MON (Clear) | RON (Clear) |
|---|---|---|---|---|---|---|---|---|---|
| 29 | 50° | 0 | 0 | 18.5 | 0.31 | 7.06 | 0.46 | 92.1 | 94.7 |
| 30 | 50° | 10 | 0.1076/1 | 18.3 | 0.31 | 7.06 | 0.47 | 93.4 | 95.8 |
| 31 | 50° | 15 | 0.171/1 | 18.3 | 0.28 | 7.06 | 0.35 | 93.6 | 96.0 |
| 32 | 50° | 25 | 0.373/1 | 18.3 | 0.32 | 7.06 | >0.5 | 93.4 | 95.5 |

From Table VI, it is seen that alkylate octane is maximum employing an alkylation catalyst comprising $HFSO_3$ and $H_2SO_4$ in a weight ratio of 0.17/1, corresponding to a fresh acid catalyst comprising 14.3 weight percent $HFSO_3$, 84% $H_2SO_4$ and 1.7% $H_2O$. Additionally, acid consumption was minimum using catalyst having a 0.17/1 weight ratio of $HFSO_3$ to $H_2SO_4$, compared to catalyst compositions having both higher and lower ratios of $HFSO_3$ to $H_2SO_4$.

It will be apparent to those skilled in the art that many variations and modifications of the present invention, which has as a principal feature the use of an acid catalyst comprising $HFSO_3$ and $H_2SO_4$ in a weight ratio of from about 0.11/1, to about 0.32/1 in a process for alkylating isoparaffin hydrocarbon with olefin hydrocarbon.

I claim:

1. An alkylation catalyst consisting essentially of $HFSO_3$ and $H_2SO_4$ in a weight ratio of from about 0.11/1 to about 0.32/1 respectively, water in the range of from about 0 to about 3 weight percent, and acid oils in the range of from about 0 to about 10 weight percent, said catalyst having a titratable acidity of from about 16.5 to about 18.5 meq/gm.

2. The composition of claim 1 wherein said acid catalyst comprises $HFSO_3$ and $H_2SO_4$ in a weight ratio of about 0.17/1 respectively.

* * * * *